United States Patent
Chen et al.

(10) Patent No.: US 12,522,613 B2
(45) Date of Patent: Jan. 13, 2026

(54) FULL CONTINUOUS-FLOW PREPARATION METHOD OF (+)-BIOTIN

(71) Applicant: Fudan University, Shanghai (CN)

(72) Inventors: Fener Chen, Shanghai (CN); Dang Cheng, Shanghai (CN); Jiale Wu, Shanghai (CN); Meifen Jiang, Shanghai (CN); Li Wan, Shanghai (CN); Jiaqi Wang, Shanghai (CN)

(73) Assignee: Fudan University, Shanghai (CN)

( * ) Notice: Subject to any disclaimer, the term of this patent is extended or adjusted under 35 U.S.C. 154(b) by 574 days.

(21) Appl. No.: 18/166,906

(22) Filed: Feb. 9, 2023

(65) Prior Publication Data
US 2023/0183260 A1     Jun. 15, 2023

(30) Foreign Application Priority Data
Feb. 25, 2022 (CN) .......... 202210178957.X

(51) Int. Cl.
*C07D 495/04* (2006.01)
*B01J 19/00* (2006.01)

(52) U.S. Cl.
CPC ........ *C07D 495/04* (2013.01); *B01J 19/0093* (2013.01); *B01J 2219/00033* (2013.01); *B01J 2219/00867* (2013.01)

(58) Field of Classification Search
CPC .... B01J 19/00; B01J 19/0046; B01J 19/0053; B01J 19/0093; B01J 2219/00; B01J 2219/00002; B01J 2219/00027; B01J 2219/00033; B01J 2219/00781; B01J 2219/00851; B01J 2219/00867; B01J 2219/00889; B01J 2219/0095; C07B 2200/00; C07B 2200/07; C07D 495/00–04
See application file for complete search history.

(56) References Cited

FOREIGN PATENT DOCUMENTS
CN    112299995 B    3/2022

OTHER PUBLICATIONS

Shimizu, Facile synthesis of (+)-biotin via Fukuyama coupling reaction, Tetrahedron Letters 41 (2000) 5099-5101 (Year: 2000).*
Shimizu, A Novel and Practical Synthesis of (+)-Biotin via Fukuyama Coupling Reaction, Yakugaku Zasshi 123(2) 43-53 (2003) (Year: 2003).*

* cited by examiner

*Primary Examiner* — Natasha E Young

(57) ABSTRACT

A full continuous-flow preparation method of (+)-biotin, including: subjecting a cyclic anhydride and a chiral biphenyl propylene glycol to asymmetric ring-opening reaction to produce a first intermediate, which undergoes selective reduction with a borohydride and cyclization with an inorganic mineral acid to produce (3aS, 6aR)-lactone; subjecting the (3aS, 6aR)-lactone and a sulfenylating reagent to sulfenylation to produce (3aS, 6aR)-thiolactone, which undergoes Fukuyama coupling with a zinc reagent in the presence of a palladium catalyst and elimination reaction in the presence of an inorganic mineral acid to produce an alkenyl valerate compound; subjecting the alkenyl valerate compound to reduction in the presence of a Pd/C catalyst to produce a valerate ester, which undergoes hydrolysis to produce a valeric acid salt; and subjecting the valeric acid salt to debenzylation in the presence of an inorganic mineral acid to produce the target product (+)-biotin.

10 Claims, No Drawings

FULL CONTINUOUS-FLOW PREPARATION METHOD OF (+)-BIOTIN

CROSS-REFERENCE TO RELATED APPLICATIONS

This application claims the benefit of priority from Chinese Patent Application No. 202210178957. X, filed on Feb. 25, 2022. The content of the aforementioned application, including any intervening amendments thereto, is incorporated herein by reference.

TECHNICAL FIELD

This application relates to fine chemical engineering, and more specifically to a full continuous-flow preparation method of (+)-biotin.

BACKGROUND (+)-Biotin ((3aS,4S,6aR)-hexahydro-2-oxo-1H-thieno[3,4-d] imidazole-4-norvaleric acid, shown in formula (1)), also known as vitamin H or coenzyme R, is a water-soluble vitamin (Vitamin B7), and mainly participates in the metabolism of carbohydrates, lipids, proteins and nucleic acids in vivo.

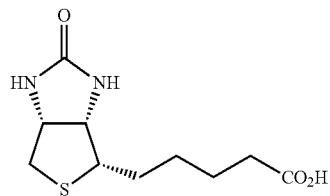

(1)

Biotin deficiency in humans is usually characterized by dermatitis, nausea, vomiting, mild depression, and weight loss. For animals, the biotin deficiency may cause parakeratosis, ulcers, low farrowing rate, high embryonic mortality, and even death. These symptoms can be relieved through the supplementation with an appropriate amount of (+)-biotin. Therefore, the (+)-biotin has been widely used in medicines, food additives, feed additives, etc.

The existing synthesis routes using a batch reactor involve multiple stepwise reactions to produce (+)-biotin from starting materials, where the reactions are respectively followed by corresponding separation and purification operations, and the operations are performed independently. Therefore, the existing synthesis strategy is generally accompanied by large time and labor consumption, complicated operation, high material loss, low yield, poor efficiency and low automation level. In addition, the inherent defects of the traditional batch reactor, such as poor molecular mixing performance and heat and mass transfer, will also cause large time consumption, high safety hazard, and high unit consumption and energy consumption. Therefore, it is urgently needed to develop a continuous preparation method for (+)-biotin with short reaction time, low energy and material consumption, low consumption, high process efficiency, and good intrinsic safety.

SUMMARY

To overcome the defects in the existing synthesis approaches, this application provides a full continuous-flow preparation method of (+)-biotin, which is characterized by shortened reaction time, enhanced automation degree and time-space efficiency, high yield, reduced material and energy consumption, and good safety, and is thus suitable for industrial application.

Technical solutions of this application are described as follows.

This application provides a full continuous-flow preparation method of (+)-biotin (1) using a multi-stage micro-reaction system, the multi-stage micro-reaction system comprising a first micro-reaction unit, a second micro-reaction unit, a third micro-reaction unit, a fourth micro-reaction unit, a fifth micro-reaction unit, a sixth micro-reaction unit, a seventh micro-reaction unit, an eighth micro-reaction unit, and a ninth micro-reaction unit connected in series; and the full continuous-flow preparation method comprising:

(S1) subjecting a cyclic anhydride (2) and a chiral biphenyl propylene glycol (3) to an asymmetric ring-opening reaction in the presence of an organic base (4) to produce a dicarboxylic acid monoester compound (5);

(S2) subjecting the dicarboxylic acid monoester compound (5) and a borohydride (6) to a selective reduction reaction to produce a 5-hydroxymethyl-4-carboxylic acid compound (7);

(S3) subjecting the 5-hydroxymethyl-4-carboxylic acid compound (7) and an inorganic mineral acid (8) to a cyclization reaction to produce a (3aS, 6aR)-lactone (9);

(S4) subjecting the (3aS, 6aR)-lactone (9) and a sulfenylating reagent (10) to a sulfenylation to produce (3aS, 6aR)-thiolactone (11);

(S5) subjecting the (3aS, 6aR)-thiolactone (11) and a zinc reagent (12) to Fukuyama coupling reaction in the presence of a palladium catalyst to produce a hydroxy valerate compound (13);

(S6) subjecting the hydroxy valerate compound (13) to an elimination reaction in the presence of an inorganic mineral acid (14) to produce an alkenyl valerate compound (15);

(S7) subjecting the alkenyl valerate compound (15) to a selective reduction reaction in the presence of a palladium-on-carbon (Pd/C) catalyst to produce a valerate ester (16);

(S8) subjecting the valerate ester (16) to a hydrolysis reaction in the presence of an inorganic base (17) to produce a valeric acid salt (18); and (S9) subjecting the valeric acid salt (18) to a debenzylation reaction in the presence of an inorganic mineral acid (19) to produce a target product (+)-biotin (1).

In an embodiment, in step (S1), a structural formula of the cyclic anhydride (2) is:

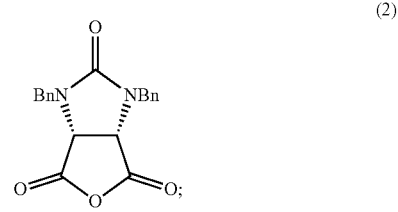 [SMILES: O=C1OC(=O)[C@H]2[C@@H]1N(Cc1ccccc1)C(=O)N2Cc1ccccc1]

(2)

a structural formula of the chiral biphenyl propylene glycol (3) is:

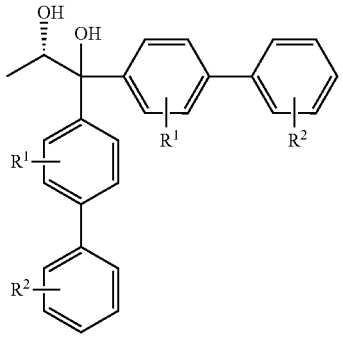

(3)

wherein $R_1$ is hydrogen, fluorine, chlorine, bromine, iodine, a $C_1$-$C_6$ alkyl, a $C_3$-$C_6$ cycloalkyl, or a $C_1$-$C_6$ alkoxy; and $R_2$ is hydrogen, fluorine, chlorine, bromine, iodine, a $C_1$-$C_6$ alkyl, a $C_3$-$C_6$ cycloalkyl, or a $C_1$-$C_6$ alkoxy;

the biphenyl-like chiral propylene glycol (3) has a high diastereoselective reaction effect, mild reaction conditions, easy operations, high chemical yield, optical purity, and is convenient for synthesis with abundant source and recovery;

the organic base (4) is an organic tertiary amine expressed as $NR_3R_4R_5$, and is selected from the group consisting of triethylamine, tripropylamine, triisobutylamine, tri-n-butylamine, tripentylamine, trihexylamine, triheptylamine, trioctylamine, 1,4-diazabicyclo[2.2.2]octane (DABCO), 4-dimethylaminopyridine, 1,8-diazabicycloundec-7-ene (DBU), and a combination thereof;

the dicarboxylic acid monoester compound (5) comprises two diastereoisomers (5a) and (5b) respectively shown as:

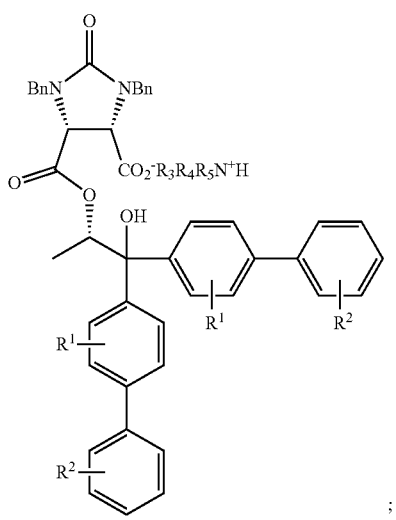

; and

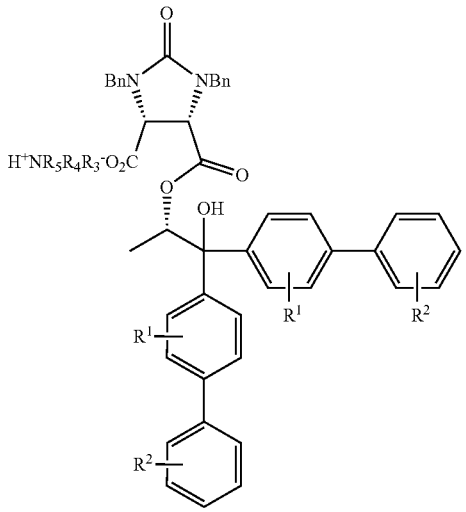

In an embodiment, in step (S1), the first micro-reaction unit comprises a first micro-mixer and a first micro-channel reactor; a solution of the cyclic anhydride (2) in a first solvent is fed to the first micro-mixer through a first inlet of the first micro-mixer, and a solution of the chiral biphenyl propylene glycol (3) and the organic base (4) in a second solvent is fed to the first micro-mixer through a second inlet of the first micro-mixer; an outlet of the first micro-mixer is directly connected to an inlet of the first micro-channel reactor; the solution of the cyclic anhydride (2) and the solution of the chiral biphenyl propylene glycol (3) and the organic base (4) are mixed in the first micro-mixer and then enter the first micro-channel reactor to undergo the asymmetric ring-opening reaction to produce a first reaction mixture;

In an embodiment, in step (S1), a molar ratio of the cyclic anhydride (2) to the chiral biphenyl propylene glycol (3) to the organic base (4) is controlled to 1:0.8-3.0:0.8-3.0, preferably, 1:0.90-2.5:0.90-2.5.

In an embodiment, in step (S1), the first solvent and the second solvent are independently selected from the group consisting of benzene, toluene, xylene, anisole, fluorobenzene, chlorobenzene, bromobenzene, dichloromethane, trichloromethane, 1,2-dichloroethane, tetrahydrofuran, 1,4-dioxane, ethylene glycol dimethyl ether, ethyl ether, n-hexane, cyclohexane, acetonitrile, acetone, N, N-dimethylformamide, N, N-dimethylacetamide, dimethyl sulfoxide, N-methyl pyrrolidone, sulfolane, 1,3-dimethyl-2-imidazolidinone, hexamethylphosphoramide, N-alkylpyridinium salt, 1,3-dialkyl-imidazolium salt, and a combination thereof; and preferably, tetrahydrofuran or toluene.

In an embodiment, in step (S1), the first micro-mixer is a static mixer, a T-type micro-mixer, a Y-type micro-mixer, a coaxial-flow micro-mixer, or a flow-focusing micro-mixer.

In an embodiment, in step (S1), the first micro-mixer is controlled at −20-80° C.

In an embodiment, in step (S1), the first micro-channel reactor is controlled at −20-80° C., preferably, −15-60° C.

In an embodiment, in step (S1), the first micro-channel reactor is a tubular oscillatory micro-channel reactor or a plate-type oscillatory micro-channel reactor; an inner diameter of the tubular oscillatory micro-channel reactor is 100 μm-10 mm, preferably, 120 μm-5.35 mm; the plate-type oscillatory micro-channel reactor comprises a first heat exchange layer, a reaction layer, and a second heat exchange layer successively arranged from top to bottom; the reaction layer is provided with a reaction fluid channel; and a hydraulic diameter of the reaction fluid channel is 100 μm-10 mm, preferably, 120 μm-5.35 mm.

In an embodiment, in step (S1), the first micro-channel reactor is an oscillatory micro-channel reactor, preferably, a Coflore agitated cell reactor (AM Technology, UK).

In an embodiment, in step (S1), flow rates of the solution of the cyclic anhydride (2) and the solution of the chiral biphenyl propylene glycol (3) and the organic base (4) are controlled such that a residence time of a mixture flowing out of the first micro-mixer in the first micro-channel reactor is 1-40 min.

In an embodiment, in step (S2), the borohydride (6) is selected from the group consisting of lithium borohydride, sodium borohydride, potassium borohydride, and calcium borohydride, preferably, lithium borohydride, which is stable and has a better reaction effects and low costs.

In an embodiment, in step (S2), the second micro-channel unit comprises a second micro-mixer, a second micro-channel reactor, a third micro-mixer and a first continuous liquid-liquid extractor; an outlet of the first micro-channel reactor is connected to a first inlet of the second micro-mixer; the first reaction mixture flows into the second micro-mixer through the first inlet of the second micro-mixer; a solution of the borohydride (6) in a third solvent is fed to the second micro-mixer through a second inlet of the second micro-mixer; an outlet of the second micro-mixer is directly connected to an inlet of the second micro-channel reactor; the first reaction mixture and the solution of the borohydride (6) are mixed in the second micro-mixer and then enter the second micro-channel reactor to undergo the selective reduction reaction to produce a second reaction mixture.

In an embodiment, in step (S2), the third solvent is selected from the group consisting of benzene, toluene, xylene, anisole, fluorobenzene, chlorobenzene, bromobenzene, dichloromethane, trichloromethane, 1,2-dichloroethane, tetrahydrofuran, 1,4-dioxane, ethylene glycol dimethyl ether, ethyl ether, n-hexane, cyclohexane, acetonitrile, acetone, N, N-dimethylformamide, N, N-dimethylacetamide, dimethyl sulfoxide, N-methyl pyrrolidone, sulfolane, 1,3-dimethyl-2-imidazolidinone, hexamethylphosphoramide, N-alkylpyridinium salt, 1,3-dialkyl-imidazolium salt, and a combination thereof;

In an embodiment, in step (S2), the second micro-mixer is a static mixer, a T-type micro-mixer, a Y-type micro-mixer, a coaxial-flow micro-mixer, or a flow-focusing micro-mixer.

In an embodiment, in step (S2), a molar ratio of the borohydride to the dicarboxylic acid monoester compound (5) in the first reaction mixture is 1-8:1, preferably 1.02-5.0:1, facilitating the material saving.

In an embodiment, in step (S2), the second micro-mixer is controlled at 0-100° C.

In an embodiment, in step (S2), the second micro-channel reactor is controlled at 0-100° C., preferably 0-80° C., which shows better reaction effects and lower energy consumption.

In an embodiment, in step (S2), the second micro-channel reactor is a tubular micro-channel reactor or a plate-type micro-channel reactor; an inner diameter of the tubular micro-channel reactor is 100 μm-10 mm, preferably 120 μm-5.35 mm; the plate-type micro-channel reactor comprises a first heat exchange layer, a reaction layer, and a second heat exchange layer successively arranged from top to bottom; the reaction layer is provided with a reaction fluid channel; and a hydraulic diameter of the reaction fluid channel is 100 μm-10 mm, preferably, 120 μm-5.35 mm.

In an embodiment, in step (S2), an outlet of the second micro-channel reactor is connected to a first inlet of the third micro-mixer, and water is fed to the third micro-mixer through a second inlet of the third micro-mixer; the second reaction mixture and water are mixed in the third micro-mixer and enter the first continuous liquid-liquid extractor for extraction with ethyl acetate or toluene; a first organic phase flows out of the first continuous liquid-liquid extractor through an organic phase outlet, and a first aqueous phase flows out of the first continuous liquid-liquid extractor through an aqueous phase outlet; and the first organic phase is collected to recover the chiral biphenyl propylene glycol (3) for reuse.

In an embodiment, in step (S3), a structural formula of the (3aS, 6aR)-lactone (9) is:

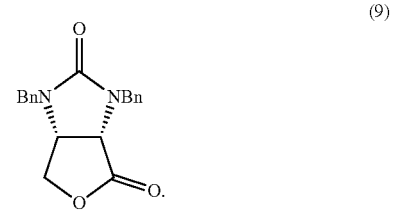 [SMILES: O=C1OC[C@H]2[C@@H]1N(Cc1ccccc1)C(=O)N2Cc1ccccc1]

(9)

In an embodiment, in step (S3), the third micro-reaction unit comprises a fourth micro-mixer, a third micro-channel reactor, a second continuous liquid-liquid extractor and a continuous concentrator; the aqueous phase outlet of the first continuous liquid-liquid extractor is connected to a first inlet of the fourth micro-mixer to allow the first aqueous phase to directly flow into the fourth micro-mixer; a solution of the inorganic mineral acid (8) is fed to the fourth micro-mixer through a second inlet of the fourth micro-mixer; an outlet of the fourth micro-mixer is connected to an inlet of the third micro-channel reactor; the first aqueous phase and the solution of the inorganic mineral acid (8) are mixed in the fourth micro-mixer and then enter the third micro-channel reactor to undergo the cyclic reaction to form a third reaction mixture.

In an embodiment, in step (S3), the inorganic mineral acid (8) is selected from the group consisting of hydrochloric acid, sulfuric acid, nitric acid, and phosphoric acid; and preferably, hydrochloric acid.

In an embodiment, in step (S3), the solution of the inorganic mineral acid (8) is prepared by dissolving the inorganic mineral acid (8) in water.

In an embodiment, in step (S3), the fourth micro-mixer is a static mixer, a T-type micro-mixer, a Y-type micro-mixer, a coaxial-flow micro-mixer, or a flow-focusing micro-mixer.

In an embodiment, in step (S3), a molar ratio of the inorganic mineral acid (8) to the 5-hydroxymethyl-4-carboxylic acid compound (7) in the first aqueous phase is controlled to 1-50:1;

In an embodiment, in step (S3), the fourth micro-mixer is controlled at −10-120° C. In an embodiment, in step (S3), the third micro-channel reactor is controlled at 10-150° C., preferably, 20-120° C.

In an embodiment, in step (S3), the third micro-channel reactor is a tubular micro-channel reactor or a plate-type micro-channel reactor; an inner diameter of the tubular micro-channel reactor is 100 μm-10 mm, preferably, 120 μm-5.35 mm; the plate-type micro-channel reactor comprises a first heat exchange layer, a reaction layer, and a second heat exchange layer successively arranged from top to bottom; and the reaction layer is provided with a reaction fluid channel having a hydraulic diameter of 100 μm-10 mm, preferably, 120 μm-5.35 mm.

In an embodiment, in step (S3), an outlet of the third micro-channel reactor is connected to an inlet of the second continuous liquid-liquid extractor to allow the third reaction mixture to enter the second continuous liquid-liquid extractor for extraction with ethyl acetate or toluene; a second organic phase flows out of the second continuous liquid-liquid extractor through an organic phase outlet, and a second aqueous phase flows out of the second continuous liquid-liquid extractor through an aqueous phase outlet; the organic phase outlet of the second continuous liquid-liquid extractor is connected to an inlet of the continuous concentrator to allow the second organic phase to enter the continuous concentrator for concentration to produce a concentrated liquid In an embodiment, in step (S4), a structural formula of the sulfenylating reagent (10) is:

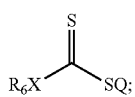
(10)

wherein $R_6$ is a $C_1$-$C_6$ alkyl or a $C_3$-$C_6$ cycloalkyl; X is oxygen or sulphur; and Q is potassium or sodium; and a structural formula of the (3aS, 6aR)-thiolactone (11) is:

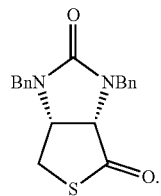
(11)

In an embodiment, in step (S4), the fourth micro-reaction unit comprises a fifth micro-mixer, a fourth micro-channel reactor, and a first back pressure valve; an outlet of the continuous concentrator is connected to a first inlet of the fifth micro-mixer to allow the concentrated liquid to enter the fifth micro-mixer; a solution of the sulfenylating reagent (10) is fed to the fifth micro-mixer through a second inlet of the fifth micro-mixer; an outlet of the fifth micro-mixer is connected to an inlet of the fourth micro-channel reactor; an outlet of the fourth micro-channel reactor is connected to an inlet of the first back pressure valve; the concentrated liquid and the solution of the sulfenylating reagent (10) are mixed in the fifth micro-mixer and then enter the fourth micro-channel reactor to undergo the sulfenylation to produce a fourth reaction mixture; and the fourth reaction mixture then flows into the first back pressure valve.

In an embodiment, in step (S4), the solution of the sulfenylating reagent (10) is selected from the group consisting of N,N-dimethylformamide, N,N-dimethylacetamide, N,N-methylpyrrolidone, sulfolane, and thionyl chloride, preferably, N,N-dimethylformamide or N,N-dimethylacetamide.

In an embodiment, in step (S4), the fifth micro-mixer is a static mixer, a T-type micro-mixer, a Y-type micro-mixer, a coaxial-flow micro-mixer, or a flow-focusing micro-mixer.

In an embodiment, in step (S4), a molar ratio of the sulfenylating reagent (10) to the (3aS, 6aR)-lactone (9) in the concentrated liquid is 0.8-5.0:1.

In an embodiment, in step (S4), the fifth micro-mixer is controlled at 60-250° C., preferably, 80-180° C.

In an embodiment, in step (S4), the fourth micro-channel reactor is controlled at 60-250° C., preferably, 80-180° C.

In an embodiment, in step (S4), the fourth micro-channel reactor is a tubular micro-channel reactor or a plate-type micro-channel reactor; an inner diameter of the tubular micro-channel reactor is 100 μm-10 mm, preferably, 120 μm-5.35 mm; the plate-type micro-channel reactor comprises a first heat exchange layer, a reaction layer, and a second heat exchange layer successively arranged from top to bottom; the reaction layer is provided with a reaction fluid channel having a hydraulic diameter of 100 μm-10 mm, preferably 120 μm-5.35 mm.

In an embodiment, in step (S4), a residence time of a mixture of the concentrated liquid and the solution of the sulfenylating reagent (10) in the fourth micro-channel reactor is controlled to 1-30 min, preferably 2-27 min.

In an embodiment, in step (S4), a back pressure of the first back pressure valve is set to 0.1-2 MPa, preferably 0.2-1.5 MPa.

In an embodiment, in step (S5), a structural formula of the zinc reagent (12) is:

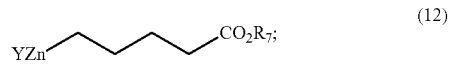
(12)

wherein Y is fluorine, chlorine, bromine, or iodine; $R_7$ is a $C_1$-$C_6$ alkyl, a $C_3$-$C_6$ cycloalkyl, a mono-substituted aryl, a poly-substituted aryl, a mono-substituted arylalkyl, or a poly-substituted arylalkyl; and a structural formula of the hydroxy valerate compound (13) is:

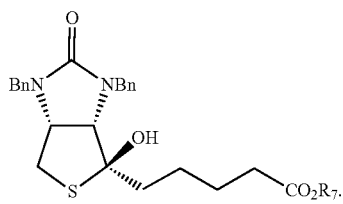
(13)

In an embodiment, in step (S5), the fifth micro-reaction unit comprises a sixth micro-mixer, a fifth micro-channel reactor, and a second back pressure valve; an outlet of the first back pressure valve is connected to a first inlet of a sixth micro-mixer to allow the fourth reaction mixture to flow into the sixth micro-mixer; a solution of the zinc reagent (12) containing the palladium catalyst is fed to the sixth micro-mixer through a second inlet of the sixth micro-mixer; an outlet of the sixth micro-mixer is connected to an inlet of the fifth micro-channel reactor; an outlet of the fifth micro-channel reactor is connected to an inlet of a second back pressure valve; the fourth reaction mixture and the solution of the zinc reagent (12) are mixed in the sixth micro-mixer and then enter the fifth micro-channel reactor to undergo the Fukuyama coupling reaction to produce a fifth reaction mixture; and the fifth reaction mixture then flows from the fifth micro-channel reactor into the second back pressure valve.

In an embodiment, in step (S5), the palladium catalyst is selected from the group consisting of palladium acetate, di(triphenylphosphine)palladium dichloride, a Pd/C catalyst, nano-palladium, and palladium hydroxide on carbon.

In an embodiment, in step (S5), a solvent for preparing the solution of the zinc reagent (12) is selected from the group consisting of N,N-dimethylformamide, N,N-dimethylacetamide, N,N-methylpyrrolidone, sulfolane, and thionyl chloride; and preferably, N,N-dimethylformamide or N,N-dimethylacetamide.

In an embodiment, in step (S5), a molar ratio of the (3aS, 6aR)-thiolactone (11) in the fourth reaction mixture to the palladium catalyst is controlled to 1:0.001-0.500.

In an embodiment, in step (S5), the sixth micro-mixer is a static mixer, a T-type micro-mixer, a Y-type micro-mixer, a coaxial-flow micro-mixer, or a flow-focusing micro-mixer.

In an embodiment, in step (S5), a molar ratio of the (3aS, 6aR)-thiolactone (11) to the zinc reagent (12) is controlled to 1:1.0-8.0.

In an embodiment, in step (S5), the sixth micro-mixer is controlled at 5-160° C., preferably, 30-155° C.

In an embodiment, in step (S5), the fifth micro-channel reactor is controlled at 5-160° C., preferably, 30-155° C.

In an embodiment, in step (S5), the fifth micro-channel reactor is a tubular micro-channel reactor or a plate-type micro-channel reactor; an inner diameter of the tubular micro-channel reactor is 100 μm-10 mm, preferably 120 μm-5.35 mm; the plate-type micro-channel reactor comprises a first heat exchange layer, a reaction layer, and a second heat exchange layer successively arranged from top to bottom; and the reaction layer is provided with a reaction fluid channel having a hydraulic diameter of 100 μm-10 mm, preferably 120 μm-5.35 mm.

In an embodiment, in step (S5), a residence time of a mixture of the fourth reaction mixture and the solution of the zinc reagent (12) in the fifth micro-channel reactor is controlled to 0.5-30 min, preferably, 1-27 min.

In an embodiment, in step (S6), a structural formula of the alkenyl valerate compound (15) is:

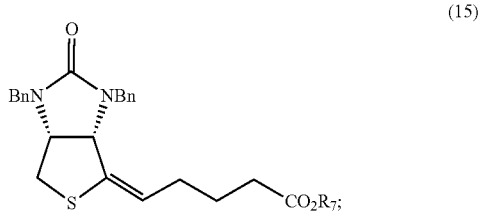

(15)

and
the inorganic mineral acid (14) is selected from the group consisting of sulfuric acid, hydrochloric acid, boric acid, phosphoric acid, carbonic acid, and nitric acid.

In an embodiment, in step (S6), the sixth micro-reaction unit comprises a seventh micro-mixer, a sixth micro-channel reactor, and a first liquid-liquid separator; an outlet of the second back pressure valve is connected to a first inlet of the seventh micro-mixer to allow the fifth reaction mixture to enter the seventh micro-mixer; a solution of the inorganic mineral acid (14) is fed to the seventh micro-mixer through a second inlet of the seventh micro-mixer; an outlet of the seventh micro-mixer is connected to an inlet of the sixth micro-channel reactor; and the fifth reaction mixture and the solution of the inorganic mineral acid (14) are mixed in the seventh micro-mixer and then enter the sixth micro-channel reactor to undergo the elimination reaction to produce a sixth reaction mixture.

In an embodiment, in step (S6), an outlet of the sixth micro-channel reactor is connected to an inlet of the first liquid-liquid separator to allow the sixth reaction mixture to enter the first liquid-liquid separator; and a third aqueous phase flows out of the first liquid-liquid separator through an aqueous phase outlet, and a third organic phase flows out of the first liquid-liquid separator through an organic phase outlet.

In an embodiment, in step (S6), the solution of the inorganic mineral acid (14) is prepared by dissolving the inorganic mineral acid (14) in water.

In an embodiment, in step (S6), the seventh micro-mixer is a static mixer, a T-type micro-mixer, a Y-type micro-mixer, a coaxial-flow micro-mixer, or a flow-focusing micro-mixer.

In an embodiment, in step (S6), the seventh micro-mixer is controlled at 5-100° C., preferably, 10-90° C.

In an embodiment, in step (S6), a molar ratio of the hydroxy valerate compound (13) in the fifth reaction mixture to the inorganic mineral acid (14) is 1:1-50.

In an embodiment, in step (S6), the sixth micro-channel reactor is a tubular micro-channel reactor or a plate-type micro-channel reactor; an inner diameter of the tubular micro-channel reactor is 100 μm-10 mm, preferably 120 μm-5.35 mm; the plate-type micro-channel reactor comprises a first heat exchange layer, a reaction layer, and a second heat exchange layer successively arranged from top to bottom; and the reaction layer is provided with a reaction fluid channel having a hydraulic diameter of 100 μm-10 mm, preferably 120 μm-5.35 mm.

In an embodiment, in step (S6), a residence time of a mixture of the fifth reaction mixture and the solution of the inorganic mineral acid (14) in the sixth micro-channel reactor is 0.5-30 min, preferably, 1-27 min.

In an embodiment, in step (S6), the sixth micro-channel reactor is controlled at 5-100° C., preferably 10-90° C.

In an embodiment, in step (S7), a structural formula of the valerate ester (16) is:

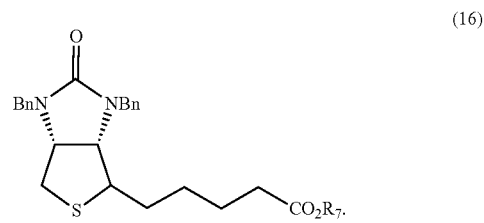

(16)

In an embodiment, in step (S7), the seventh micro-reaction unit comprises an eighth micro-mixer, a seventh micro-channel reactor, a buffer tank and a third back pressure valve; the organic phase outlet of the first liquid-liquid separator is connected to a first inlet of the eighth micro-mixer to allow the third organic phase to enter the eighth micro-mixer; hydrogen gas is fed to the eighth micro-mixer through a second inlet of the eighth micro-mixer; an outlet of the eighth micro-mixer is connected to an inlet of the seventh micro-channel reactor; the third organic phase and the hydrogen gas are mixed in the eighth micro-mixer and then enter the seventh micro-channel reactor to undergo the selective reduction reaction to produce a seventh reaction mixture; an outlet of the seventh micro-channel reactor is connected to the buffer tank; a bottom of the buffer tank is provided with a liquid outlet equipped with a valve; a top of the buffer tank is provided with a first port, a second port, and a third port; the first port is connected to nitrogen gas to provide desired pressure for the buffer tank; a pressure of the nitrogen gas is 0.1-2.0 MPa; the third port is connected to the third back pressure valve; a back pressure of the third back pressure valve is set to 0.1-1.5 MPa, and the pressure of the nitrogen gas is 0.2-1.0 MPa larger than the back pressure of the third back pressure valve; and the second port is connected to the outlet of the seventh micro-channel reactor to allow the seventh reaction mixture to enter the buffer tank.

In an embodiment, in step (S7), the Pd/C catalyst in step (S7) is a Pd/C catalyst with 0.5-30 wt. % Pd loading, a Pd(OH)$_2$/C catalyst with 0.5-30 wt. % Pd(OH)$_2$ loading, a mixture of the Pd/C catalyst with 0.5-30 wt. % Pd loading and an inert solid granular medium or a mixture of the Pd(OH)$_2$/C catalyst with 0.5-30 wt. % Pd(OH)$_2$ loading and an inert solid granular medium.

In an embodiment, in step (S7), a molar ratio of the alkenyl valerate compound (15) in the third organic phase to the hydrogen gas is controlled to 1:0.8-50.0;

In an embodiment, in step (S7), the eighth micro-mixer is controlled at 10-120° C.

In an embodiment, in step (S7), the seventh micro-channel reactor is controlled at 15-120° C.

In an embodiment, in step (S7), a residence time of a mixture of the third organic phase and the hydrogen gas in the seventh micro-channel reactor is 0.1-30 min.

In an embodiment, in step (S7), the eighth micro-mixer is a static mixer, a T-type micro-mixer, a Y-type micro-mixer, a coaxial-flow micro-mixer, or a flow-focusing micro-mixer.

In an embodiment, in step (S7), the seventh micro-channel reactor is a micro fixed-bed reactor filled with the Pd/C catalyst; and the micro fixed-bed reactor has an inner diameter of 1-100 mm, preferably, 1.5-70 mm.

In an embodiment, in step (S8), a structural formula of the valeric acid salt (18) is:

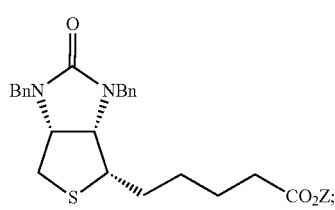

(18)

wherein Z is Na$^+$ or K$^+$.

In an embodiment, in step (S8), the eighth micro-reaction unit comprises a ninth micro-mixer, an eighth micro-channel reactor, and a second liquid-liquid separator; the liquid outlet of the buffer tank is connected to a first inlet of the ninth micro-mixer to allow the seventh reaction mixture to enter the ninth micro-mixer; a solution of the inorganic base (17) is fed to the ninth micro-mixer through a second inlet of the ninth micro-mixer; an outlet of the ninth micro-mixer is connected to an inlet of the eighth micro-channel reactor; the seventh reaction mixture and the solution of the inorganic base (17) are mixed in the ninth micro-mixer and then enter the eighth micro-channel reactor to undergo the hydrolysis reaction to produce an eighth reaction mixture.

In an embodiment, in step (S8), the inorganic base (17) is selected from the group consisting of sodium hydroxide, potassium hydroxide, lithium hydroxide, sodium carbonate, potassium carbonate, and lithium carbonate; and the solution of the inorganic base (17) is prepared by dissolving the inorganic base (17) in water.

In an embodiment, in step (S8), an outlet of the eighth micro-channel reactor is connected to an inlet of the second liquid-liquid separator to allow the eighth reaction mixture to enter the second liquid-liquid separator for separation; a fourth aqueous phase flows out of the second liquid-liquid separator through an aqueous phase outlet, and a fourth organic phase flows out of the second liquid-liquid separator through an organic phase outlet.

In an embodiment, in step (S8), the ninth micro-mixer is a static mixer, a T-type micro-mixer, a Y-type micro-mixer, a coaxial-flow micro-mixer, or a flow-focusing micro-mixer.

In an embodiment, in step (S8), a molar ratio of the valerate ester (16) in the seventh reaction mixture to the inorganic base (17) is 1:0.75-30;

In an embodiment, in step (S8), the ninth micro-mixer is controlled at 2-120° C.;

In an embodiment, in step (S8), the eighth micro-channel reactor is controlled at 15-150° C.;

In an embodiment, in step (S8), the eighth micro-channel reactor is a tubular micro-channel reactor or a plate-type micro-channel reactor; an inner diameter of the tubular micro-channel reactor is 100 μm-50 mm, preferably, 120 μm-30 mm; and a hydraulic diameter of a reaction fluid channel of the plate-type micro-channel reactor is 100 μm-50 mm, preferably, 120 μm-30 mm.

In an embodiment, in step (S8), a residence time of a mixture of the seventh reaction mixture and the solution of the inorganic base (17) in the eighth micro-channel reactor is 0.1-30 min.

In an embodiment, in step (S9), the ninth micro-reaction unit comprises a tenth micro-mixer, a ninth micro-channel reactor, and a tenth micro-channel reactor; the aqueous phase outlet of the second liquid-liquid separator is connected to a first inlet of the tenth micro-mixer to allow the fourth aqueous phase to enter the tenth micro-mixer; a solution of the inorganic mineral acid (19) is fed to the tenth micro-mixer through a second inlet of the tenth micro-mixer; an outlet of the tenth micro-mixer is connected to an inlet of the ninth micro-channel reactor; and the fourth aqueous phase and the solution of the inorganic mineral acid (19) are mixed in the tenth micro-mixer and then enter the ninth micro-channel reactor to undergo the debenzylation reaction to produce a ninth reaction mixture.

In an embodiment, in step (S9), the inorganic mineral acid (19) is hydrogen bromide or hydrogen chloride; and the solution of the inorganic mineral acid (19) is prepared by dissolving the inorganic mineral acid (19) in water.

In an embodiment, in step (S9), a molar ratio of the valeric acid salt (18) in the fourth aqueous phase to the inorganic mineral acid (19) is 1:0.75-30.

In an embodiment, in step (S9), the tenth micro-mixer is controlled at −10-25° C.; the ninth micro-channel reactor is controlled at 25-200° C.

In an embodiment, in step (S9), a residence time of a mixture of the fourth aqueous phase and the solution of the inorganic mineral acid (19) in the ninth micro-channel reactor is 0.1-30 min.

In an embodiment, in step (S9), the tenth micro-mixer is a static mixer, a T-type micro-mixer, a Y-type micro-mixer, a coaxial-flow micro-mixer, or a flow-focusing micro-mixer.

In an embodiment, in step (S9), the ninth micro-channel reactor is a tubular micro-channel reactor or a plate-type micro-channel reactor; an inner diameter of the tubular micro-channel reactor is 100 μm-50 mm, preferably, 120 μm-30 mm; and a hydraulic diameter of a reaction fluid channel of the plate-type micro-channel reactor is 100 μm-50 mm, preferably, 120 μm-30 mm.

In an embodiment, in step (S9), the ninth micro-channel reactor is a microwave flow reactor, and a reaction fluid channel of the microwave flow reactor is 100 μm-50 mm, preferably, 120 μm-30 mm.

In an embodiment, in step (S9), an outlet of the ninth micro-channel reactor is connected to an inlet of the tenth micro-channel reactor to allow the ninth reaction mixture to enter the tenth micro-channel reactor.

In an embodiment, in step (S9), the tenth micro-channel reactor is a tubular micro-channel reactor or a plate-type micro-channel reactor; an inner diameter of the tubular micro-channel reactor is 1-10 mm; and a hydraulic diameter of a reaction fluid channel of the plate-type micro-channel reactor is 1-10 mm.

In an embodiment, in step (S9), the tenth micro-channel reactor is controlled at −35-15° C. to allow the target product (+)-biotin (1) to be crystallized and precipitated; and a reaction mixture flowing out of the tenth micro-channel reactor is collected and filtered to obtain the target product (+)-biotin (1).

Compared with the prior art, this application has the following beneficial effects.

(1) The preparation method provided herein realizes the continuous synthesis of the target product (+)-biotin from raw materials, and has a high degree of automation, no external intervention, and a high space-time efficiency, significantly reducing labor consumption and intensity and lowering the production cost.

(2) The dangerous reaction processes, such as high-temperature and high-pressure reactions, and hydrogenation reactions, are all completed in the reaction fluid channels of micro-channel reactors. The small volume of the reaction fluid channel leads to small online liquid holdup capacity, enhancing the intrinsic safety of the whole process.

(3) Compared to the existing preparation strategies using a batch reactor (generally consuming about two weeks), the synthesis route provided herein greatly reduces the time consumption (less than 1 h).

(4) In the preparation method provided herein, the material mixing, mass transfer and reaction processes are completed in the micro-mixers and the reaction fluid channels of the micro-channel reactors, which avoids the use of stirring devices, thus significantly reducing the total energy consumption.

(5) By means of the micro-channel reactor, the reaction process is enhanced, and the yield of each reaction is improved. Moreover, through the multi-stage series-connected reaction system, the intermediate post-treatment process is avoided, and the material loss is reduced. In this way, the total yield is increased from merely about 30~35% (obtained by the batch synthesis) to more than 48.7%.

DETAILED DESCRIPTION OF EMBODIMENTS

To describe the contents, features, objects and effects of the technical solutions in detail, this application will be described below with reference to the embodiments. It should be noted that the embodiments are merely illustrative to facilitate the understanding and implementation of the present disclosure, and are not intended to limit the present disclosure.

Example 1

Provided herein was a full continuous-flow preparation method of (+)-biotin (1). A solution of a cyclic anhydride (2) (0.1 M) in tetrahydrofuran was pumped to a first micro-mixer through a first inlet of the first micro-mixer, and a solution of a chiral biphenyl propylene glycol (3) ($R_1$ and $R_2$ were both hydrogen) and tri-n-butylamine in tetrahydrofuran was pumped to the first micro-mixer through a second inlet of the first micro-mixer, where the first micro-mixer was a T-type micro-mixer with an inner diameter of 0.8 mm; flow rates were controlled such that a molar ratio of the cyclic anhydride (2) to the chiral biphenyl propylene glycol (3) to the tri-n-butylamine was controlled to 1:1.05:1; and the first micro-mixer was controlled at 0° C. The reaction mixture then flowed from the first micro-mixer into a first micro-channel reactor for reaction, where the first micro-channel reactor was a polytetrafluoroethylene (PTFE) tube with an inner diameter of 0.8 mm and a volume of 1.5 mL; the reaction was performed at 25° C. in the first micro-channel reactor for 7.5 min (namely, a residence time of the reaction mixture in the first micro-channel reactor was 7.5 min); and the resultant product was a dicarboxylic acid monoester compound (5). After that, the reaction mixture flowed out of the first micro-channel reactor through its outlet.

Then the reaction mixture directly entered a second micro-mixer through a first inlet of the second micro-mixer, and a solution of lithium borohydride (0.8 M) in tetrahydrofuran was pumped to the second micro-mixer through a second inlet of the second micro-mixer, where the second micro-mixer is a T-type micro-mixer with an inner diameter of 0.8 mm; the flow rate was controlled such that a molar ratio of the lithium borohydride to the cyclic anhydride (2) was controlled to 1.5:1; and the second micro-mixer was controlled at 25° C. The reaction mixture then flowed from the second micro-mixer directly into a second micro-channel reactor for reaction, where the second micro-channel reactor was a PTFE tube with an inner diameter of 0.8 mm and a volume of 3 mL; the reaction was performed at 45° C. in the second micro-channel reactor for 2.5 min (namely, a residence time of the reaction mixture in the second micro-channel reactor was 2.5 min); and the resultant product was a 5-hydroxymethyl-4-carboxylic acid compound (7). The reaction mixture flowed out of the second micro-channel reactor, and entered a third micro-mixer to be mixed with water. Then the reaction mixture was subjected to extraction with ethyl acetate in a first continuous liquid-liquid extractor, where an organic phase flowed out through an organic phase outlet, and an aqueous phase flowed out through an aqueous phase outlet.

The aqueous phase directly flowed into a fourth micro-mixer through a first inlet of the fourth micro-mixer, and an aqueous hydrochloric acid solution (1.0 M) was pumped to the fourth micro-mixer through a second inlet, where the fourth micro-mixer was a T-type micro-mixer with an inner diameter of 0.8 mm; the flow rate was controlled such that a molar ratio of hydrochloric to the cyclic anhydride (2) was 5:1; and the fourth micro-mixer was controlled at 60° C. The aqueous phase and the aqueous hydrochloric acid solution were mixed in the fourth micro-mixer and then entered a third micro-channel reactor for reaction, where the third micro-channel reactor was a PTFE tube with an inner diameter of 0.6 mm and a volume of 3 mL; the reaction was performed at 60° C. in the third micro-channel reactor for 1 min (namely, a residence time of the reaction mixture in the third micro-channel reactor was 1 min) and the resultant product was (3aS, 6aR)-lactone (9). Then the reaction mixture flowed out of the third micro-channel reactor, and underwent extraction with toluene in a second continuous liquid-liquid extractor, where an organic phase flowed out of an organic phase outlet, and an aqueous phase flowed out of an aqueous phase outlet. The organic phase directly entered a continuous concentrator for concentration to produce a concentrated liquid.

The concentrated liquid entered a fifth micro-mixer through a first inlet of the fifth micro-mixer, and a potassium thioacetate solution (sulfenylating reagent, 0.3 M) was pumped to the fifth micro-mixer through a second inlet, where the fifth micro-mixer was a T-type micro-mixer with an inner diameter of 0.8 mm; the flow rate was controlled such that a molar ratio of potassium thioacetate to the cyclic anhydride (2) was 1.2:1; and the fifth micro-mixer was controlled at 145° C. The concentrated liquid and the potassium thioacetate solution were mixed in the fifth micro-mixer and then entered a fourth micro-channel reactor for reaction, where the fourth micro-channel reactor was a PTFE tube with an inner diameter of 0.8 mm and a volume of 4.0 mL; the reaction was performed at 145° C. in the fourth micro-channel reactor for 10 min (namely, a residence time of the reaction mixture in the fourth micro-channel reactor was 10 min); and the resultant product was (3aS, 6aR)-thiolactone (11). The reaction mixture flowed from the third micro-channel reactor into a first back pressure valve, and then flowed out of the first back pressure valve.

The reaction mixture then flowed into a sixth micro-mixer through a first inlet, and a 5-ethoxy-5-oxopentylzinc bromide tetrahydrofuran solution (zinc reagent solution, 0.25 M) containing 5 mol % palladium acetate was pumped to the sixth micro-mixer through a second inlet, where the sixth micro-mixer was a T-type micro-mixer with an inner diameter of 0.8 mm; flow rates were controlled such that a molar ratio of the cyclic anhydride (2) to the 5-ethoxy-5-oxopentylzinc bromide was 1:1.05; and the sixth micro-mixer was controlled at 105° C. The reaction mixture was mixed and then directly entered a fifth micro-channel reactor to undergo a Fukuyama coupling reaction, where the fifth micro-channel reactor was a PTFE tube with an inner diameter of 0.6 mm and a volume of 4.0 mL; the Fukuyama coupling reaction was performed at 105° C. in the fifth micro-channel reactor for 10 min (namely, a residence time of the reaction mixture in the fifth micro-channel reactor was 10 min); and the resultant product was a hydroxy valerate compound (13). The reaction mixture then flowed from the fifth micro-channel reactor into a second back pressure valve, and then flowed out of the second back pressure valve.

The reaction mixture then entered a seventh micro-mixer through a first inlet, and an aqueous hydrochloric acid solution (1.0 M) was pumped to the seventh micro-mixer through a second inlet, where the seventh micro-mixer was a T-type micro-mixer with an inner diameter of 0.8 mm; the flow rate was controlled such that a molar ratio of the cyclic anhydride (2) to hydrochloric was 1:8; and the seventh micro-mixer was controlled at 45° C. The reaction mixture and the aqueous hydrochloric acid solution were mixed in the seventh micro-mixer and then entered a sixth micro-channel reactor to undergo an elimination reaction, where the sixth micro-channel reactor was a PTFE tube with an inner diameter of 0.8 mm and a volume of 3.0 mL; the elimination reaction was performed at 45° C. in the sixth micro-channel reactor for 10 min (namely, a residence time of the reaction mixture in the sixth micro-channel reactor was 10 min); and the resultant product was an alkenyl valerate compound (15). The reaction mixture flowed out of the sixth micro-channel reactor, and entered a first liquid-liquid separator for separation, where an aqueous phase flowed out through an aqueous phase outlet, and an organic phase flowed out through an organic phase outlet.

The organic phase directly entered an eighth micro-mixer through a first inlet, and hydrogen gas was fed to the eighth micro-mixer through a second inlet, where the eighth micro-mixer was a T-type micro-mixer with an inner diameter of 0.8 mm; the flow rate was controlled such that a molar ratio of the cyclic anhydride (2) to the hydrogen gas was 1:3; and the eighth micro-mixer was controlled at 25° C. The organic phase and the hydrogen gas were mixed in the eighth micro-mixer and then entered a seventh micro-channel reactor for reaction, where the seventh micro-channel reactor was a micro fixed-bed reactor (length: 20 cm; and inner diameter: 1 cm) filled with a mixture of 5.8 g of a Pd/C catalyst with 10 wt. % Pd loading and 14.2 g of quartz sand; a reaction volume of the micro fixed-bed reactor filled with the Pd/C catalyst was about 4.0 mL; the reaction was performed 25° C. in the seventh micro-channel reactor for 2 min (namely, a residence time of the reaction mixture in the seventh micro-channel reactor was 2 min); and the resultant product was a valerate ester (16). The reaction mixture flowed out of the seventh micro-channel reactor, and entered a buffer tank. A back pressure value of a third back pressure valve connected to a top of the buffer tank was 1.0 MPa. A pressure value of nitrogen gas connected to a top port of the buffer tank was 1.5 MPa.

The reaction mixture was pumped from the buffer tank to a ninth micro-mixer through a first inlet, and an aqueous sodium hydroxide solution (1.0 M) was pumped to the ninth micro-mixer through a second inlet, where the ninth micro-mixer was a T-type micro-mixer with an inner diameter of 0.8 mm; the flow rate was controlled such that a molar ratio of the cyclic anhydride (2) to sodium hydroxide was 1:1.5; and the ninth micro-mixer was controlled at 45° C. The reaction mixture and the aqueous sodium hydroxide solution were mixed in the ninth micro-mixer and then entered an eighth micro-channel reactor for reaction, where the reaction was performed at 25° C. in the eighth micro-channel reactor for 5.0 min (namely, a residence time of the reaction mixture in the eighth micro-channel reactor was 5.0 min); and the resultant product was a valeric acid salt (18). The reaction mixture flowed out of the eighth micro-channel reactor, and then entered a second liquid-liquid separator for separation, where an organic phase flowed out through an organic phase outlet, and an aqueous phase flowed out through an aqueous phase outlet.

The aqueous phase directly entered a tenth micro-mixer through a first inlet, and an aqueous hydrogen bromide solution (47%) was pumped to the tenth micro-mixer through a second inlet, where the tenth micro-mixer was a T-type micro-mixer with an inner diameter of 0.8 mm; the flow rate was controlled such that a molar ratio of the cyclic anhydride (2) to hydrogen bromide was 1:5; and the tenth micro-mixer was controlled at 5° C. The aqueous phase and the aqueous hydrogen bromide solution were mixed in the tenth micro-mixer and entered a ninth micro-channel reactor for reaction, where the ninth micro-channel reactor was a microwave flow reactor whose reaction fluid channel had a hydraulic diameter of 0.8 mm and a reaction volume of 8.6 mL; the reaction was performed at 145° C. in the ninth micro-channel reactor for 10 min (namely, a residence time of the reaction mixture in the ninth micro-channel reactor was 10 min).

The reaction mixture then flowed from the ninth micro-channel reactor into a tenth micro-channel reactor for crystallization, where the tenth micro-channel reactor was a PTFE tube with an inner diameter of 3.2 mm and a reaction volume of 20 mL; and the tenth micro-channel reactor was controlled at −10° C. The reaction mixture flowing out of the tenth micro-channel reactor was collected and filtered to obtain the target product (+)-biotin (1) (48% yield and 100% ee).

Example 2

The preparation method provided in Example 2 was basically the same as that in Example 1 except that in this example, the fourth micro-channel reactor was controlled at 160° C. In this example, the target product had 49.6% yield and 100% ee.

Example 3

The preparation method provided in Example 3 was basically the same as that in Example 1 except that in this example, the fifth micro-channel reactor was controlled at 120° C. In this example, the target product had 50.2% yield and 100% ee.

Example 4

The preparation method provided in Example 4 was basically the same as that in Example 1 except that in this example, the ninth micro-channel reactor was controlled at 155° C. In this example, the target product had 49.8% yield and 100% ee.

Example 5

The preparation method provided in Example 4 was basically the same as that in Example 1 except that in this example, the ninth micro-channel reactor was an ordinary PTFE tube (an inner diameter of 0.8 mm and a reaction volume of 8.6 mL) heated with an oil bath, rather than a microwave continuous flow reactor. In this example, the target product had 0% yield.

It should be noted that the above examples are only used to illustrate the technical solutions of the disclosure, and are not intended to limit the disclosure. It should be understood that any changes, replacements and modifications made by those skilled in the art without departing from the spirit of the disclosure shall fall within the scope of the present disclosure defined by the appended claims.

What is claimed is:

1. A full continuous-flow preparation method of (+)-biotin (1) using a multi-stage micro-reaction system, the multi-stage micro-reaction system comprising a first micro-reaction unit, a second micro-reaction unit, a third micro-reaction unit, a fourth micro-reaction unit, a fifth micro-reaction unit, a sixth micro-reaction unit, a seventh micro-reaction unit, an eighth micro-reaction unit, and a ninth micro-reaction unit connected in series; and the full continuous-flow preparation method comprising:

(S1) subjecting a cyclic anhydride (2) and a chiral biphenyl propylene glycol (3) to an asymmetric ring-opening reaction in the presence of an organic base (4) to produce a dicarboxylic acid monoester compound (5);

(S2) subjecting the dicarboxylic acid monoester compound (5) and a borohydride (6) to a selective reduction reaction to produce a 5-hydroxymethyl-4-carboxylic acid compound (7);

(S3) subjecting the 5-hydroxymethyl-4-carboxylic acid compound (7) and an inorganic mineral acid (8) to a cyclization reaction to produce (3aS, 6aR)-lactone (9);

(S4) subjecting the (3aS, 6aR)-lactone (9) and a sulfenylating reagent (10) to sulfenylation to produce (3aS, 6aR)-thiolactone (11);

(S5) subjecting the (3aS, 6aR)-thiolactone (11) and a zinc reagent (12) to Fukuyama coupling reaction in the presence of a palladium catalyst to produce a hydroxy valerate compound (13);

(S6) subjecting the hydroxy valerate compound (13) to an elimination reaction in the presence of an inorganic mineral acid (14) to produce an alkenyl valerate compound (15);

(S7) subjecting the alkenyl valerate compound (15) to a selective reduction reaction in the presence of a palladium-on-carbon (Pd/C) catalyst to produce a valerate ester (16);

(S8) subjecting the valerate ester (16) to a hydrolysis reaction in the presence of an inorganic base (17) to produce a valeric acid salt (18); and (S9) subjecting the valeric acid salt (18) to a debenzylation reaction in the presence of an inorganic mineral acid (19) to produce a target product (+)-biotin (1).

2. The full continuous-flow preparation method of claim 1, wherein in step (S1), a structural formula of the cyclic anhydride (2) is:

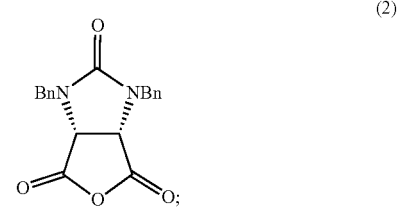 [SMILES: O=C1OC(=O)[C@H]2[C@@H]1N(Cc1ccccc1)C(=O)N2Cc1ccccc1]

a structural formula of the chiral biphenyl propylene glycol (3) is:

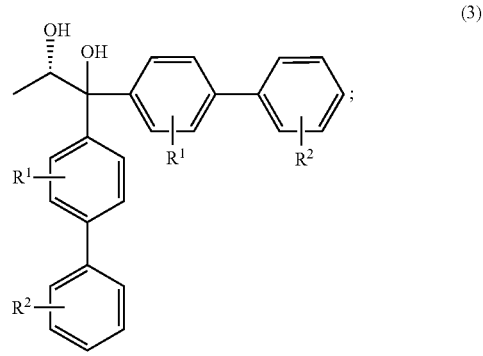

wherein $R_1$ is hydrogen, fluorine, chlorine, bromine, iodine, a $C_1$-$C_6$ alkyl, a $C_3$-$C_6$ cycloalkyl, or a $C_1$-$C_6$ alkoxy; and $R_2$ is hydrogen, fluorine, chlorine, bromine, iodine, a $C_1$-$C_6$ alkyl, a $C_3$-$C_6$ cycloalkyl, or a $C_1$-$C_6$ alkoxy;

the organic base (4) is an organic tertiary amine expressed as $NR_3R_4R_5$, and is selected from the group consisting of triethylamine, tripropylamine, triisobutylamine, tri-n-butylamine, tripentylamine, trihexylamine, triheptylamine, trioctylamine, 1,4-diazabicyclo[2.2.2]octane (DABCO), 4-dimethylaminopyridine, 1,8-diazabicycloundec-7-ene (DBU), and a combination thereof;

the dicarboxylic acid monoester compound (5) comprises two diastereoisomers (5a) and (5b) respectively shown as:

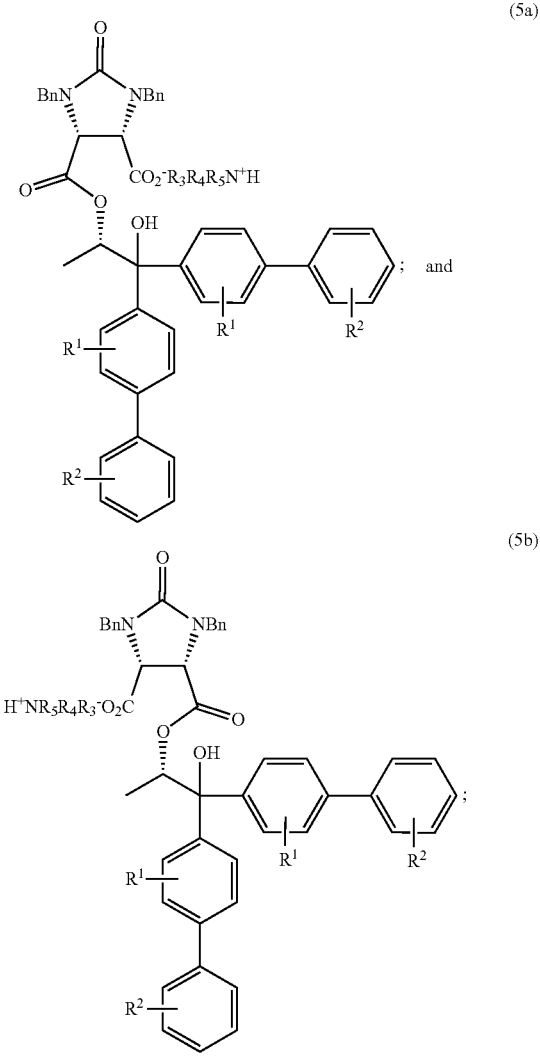

the first micro-reaction unit comprises a first micro-mixer and a first micro-channel reactor; a solution of the cyclic anhydride (2) in a first solvent is fed to the first micro-mixer through a first inlet of the first micro-mixer, and a solution of the chiral biphenyl propylene glycol (3) and the organic base (4) in a second solvent is fed to the first micro-mixer through a second inlet of the first micro-mixer; an outlet of the first micro-mixer is directly connected to an inlet of the first micro-channel reactor; the solution of the cyclic anhydride (2) and the solution of the chiral biphenyl propylene glycol (3) and the organic base (4) are mixed in the first micro-mixer and then enter the first micro-channel reactor to undergo the asymmetric ring-opening reaction to produce a first reaction mixture;

a molar ratio of the cyclic anhydride (2) to the chiral biphenyl propylene glycol (3) to and the organic base (4) is controlled to 1:0.8-3.0:0.8-3.0;

the first solvent and the second solvent are independently selected from the group consisting of benzene, toluene, xylene, anisole, fluorobenzene, chlorobenzene, bromobenzene, dichloromethane, trichloromethane, 1,2-dichloroethane, tetrahydrofuran, 1,4-dioxane, ethylene glycol dimethyl ether, ethyl ether, n-hexane, cyclohexane, acetonitrile, acetone, N, N-dimethylformamide, N, N-dimethylacetamide, dimethyl sulfoxide, N-methyl pyrrolidone, sulfolane, 1,3-dimethyl-2-imidazolidinone, hexamethylphosphoramide, N-alkylpyridinium salt, 1,3-dialkyl-imidazolium salt, and a combination thereof;

the first micro-mixer is a static mixer, a T-type micro-mixer, a Y-type micro-mixer, a coaxial-flow micro-mixer, or a flow-focusing micro-mixer;

the first micro-mixer is controlled at −20-80° C.;

the first micro-channel reactor is controlled at −20-80° C.;

the first micro-channel reactor is a tubular oscillatory micro-channel reactor or a plate-type oscillatory micro-channel reactor; an inner diameter of the tubular oscillatory micro-channel reactor is 100 μm-10 mm; the plate-type oscillatory micro-channel reactor comprises a first heat exchange layer, a reaction layer, and a second heat exchange layer successively arranged from top to bottom; the reaction layer is provided with a reaction fluid channel; and a hydraulic diameter of the reaction fluid channel is 100 μm-10 mm;

the first micro-channel reactor is an oscillatory micro-channel reactor; and flow rates of the solution of the cyclic anhydride (2) and the solution of the chiral biphenyl propylene glycol (3) and the organic base (4) are controlled such that a residence time of a mixture flowing out of the first micro-mixer in the first micro-channel reactor is 1-40 min.

3. The full continuous-flow preparation method of claim 2, wherein in step (S2), the borohydride (6) is selected from the group consisting of lithium borohydride, sodium borohydride, potassium borohydride, and calcium borohydride;

the second micro-channel unit comprises a second micro-mixer, a second micro-channel reactor, a third micro-mixer and a first continuous liquid-liquid extractor; an outlet of the first micro-channel reactor is connected to a first inlet of the second micro-mixer; the first reaction mixture flows into the second micro-mixer through the first inlet of the second micro-mixer; a solution of the borohydride (6) in a third solvent is fed to the second micro-mixer through a second inlet of the second micro-mixer; an outlet of the second micro-mixer is directly connected to an inlet of the second micro-channel reactor; the first reaction mixture and the solution of the borohydride (6) are mixed in the second micro-mixer and then enter the second micro-channel reactor to undergo the selective reduction reaction to produce a second reaction mixture;

the third solvent is selected from the group consisting of benzene, toluene, xylene, anisole, fluorobenzene, chlorobenzene, bromobenzene, dichloromethane, trichloromethane, 1,2-dichloroethane, tetrahydrofuran, 1,4-dioxane, ethylene glycol dimethyl ether, ethyl ether, n-hexane, cyclohexane, acetonitrile, acetone, N, N-dimethylformamide, N, N-dimethylacetamide, dimethyl sulfoxide, N-methyl pyrrolidone, sulfolane, 1,3-dimethyl-2-imidazolidinone, hexamethylphosphoramide, N-alkylpyridinium salt, 1,3-dialkyl-imidazolium salt, and a combination thereof;

the second micro-mixer is a static mixer, a T-type micro-mixer, a Y-type micro-mixer, a coaxial-flow micro-mixer, or a flow-focusing micro-mixer;

a molar ratio of the borohydride to the dicarboxylic acid monoester compound (5) in the first reaction mixture is 1-8:1;

the second micro-mixer is controlled at 0-100° C.;

the second micro-channel reactor is controlled at 0-100° C.;

the second micro-channel reactor is a tubular micro-channel reactor or a plate-type micro-channel reactor; an inner diameter of the tubular micro-channel reactor is 100 μm-10 mm; the plate-type micro-channel reactor comprises a first heat exchange layer, a reaction layer, and a second heat exchange layer successively arranged from top to bottom; the reaction layer is provided with a reaction fluid channel; and a hydraulic diameter of the reaction fluid channel is 100 μm-10 mm; and an outlet of the second micro-channel reactor is connected to a first inlet of the third micro-mixer, and water is fed to the third micro-mixer through a second inlet of the third micro-mixer; the second reaction mixture and water are mixed in the third micro-mixer and enter the first continuous liquid-liquid extractor for extraction with ethyl acetate or toluene; a first organic phase flows out of the first continuous liquid-liquid extractor through an organic phase outlet, and a first aqueous phase flows out of the first continuous liquid-liquid extractor through an aqueous phase outlet; and the first organic phase is collected to recover the chiral biphenyl propylene glycol (3) for reuse.

4. The full continuous-flow preparation method of claim 3, wherein in step (S3), a structural formula of the (3aS, 6aR)-lactone (9) is:

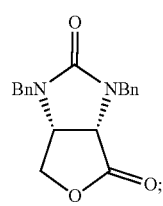

(9)

the third micro-reaction unit comprises a fourth micro-mixer, a third micro-channel reactor, a second continuous liquid-liquid extractor and a continuous concentrator; the aqueous phase outlet of the first continuous liquid-liquid extractor is connected to a first inlet of the fourth micro-mixer to allow the first aqueous phase to directly flow into the fourth micro-mixer; a solution of the inorganic mineral acid (8) is fed to the fourth micro-mixer through a second inlet of the fourth micro-mixer; an outlet of the fourth micro-mixer is connected to an inlet of the third micro-channel reactor;

the first aqueous phase and the solution of the inorganic mineral acid (8) are mixed in the fourth micro-mixer and then enter the third micro-channel reactor to undergo the cyclic reaction to form a third reaction mixture;

the inorganic mineral acid (8) is selected from the group consisting of hydrochloric acid, sulfuric acid, nitric acid, and phosphoric acid; and the solution of the inorganic mineral acid (8) is prepared by dissolving the inorganic mineral acid (8) in water;

the fourth micro-mixer is a static mixer, a T-type micro-mixer, a Y-type micro-mixer, a coaxial-flow micro-mixer, or a flow-focusing micro-mixer;

a molar ratio of the inorganic mineral acid (8) to the 5-hydroxymethyl-4-carboxylic acid compound (7) in the first aqueous phase is controlled to 1-50:1;

the fourth micro-mixer is controlled at −10-120° C.;

the third micro-channel reactor is controlled at 10-150° C.;

the third micro-channel reactor is a tubular micro-channel reactor or a plate-type micro-channel reactor; an inner diameter of the tubular micro-channel reactor is 100 μm-10 mm; the plate-type micro-channel reactor comprises a first heat exchange layer, a reaction layer, and a second heat exchange layer successively arranged from top to bottom; and the reaction layer is provided with a reaction fluid channel having a hydraulic diameter of 100 μm-10 mm; and an outlet of the third micro-channel reactor is connected to an inlet of the second continuous liquid-liquid extractor to allow the third reaction mixture to enter the second continuous liquid-liquid extractor for extraction with ethyl acetate or toluene; a second organic phase flows out of the second continuous liquid-liquid extractor through an organic phase outlet, and a second aqueous phase flows out of the second continuous liquid-liquid extractor through an aqueous phase outlet; the organic phase outlet of the second continuous liquid-liquid extractor is connected to an inlet of the continuous concentrator to allow the second organic phase to enter the continuous concentrator for concentration to produce a concentrated liquid.

5. The full continuous-flow preparation method of claim 4, wherein in step (S4), a structural formula of the sulfenylating reagent (10) is:

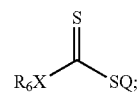

(10)

wherein $R_6$ is a $C_1$-$C_6$ alkyl or a $C_3$-$C_6$ cycloalkyl; X is oxygen or sulphur; and Q is potassium or sodium;

a structural formula of the (3aS, 6aR)-thiolactone (11) is:

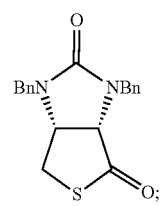

(11)

the fourth micro-reaction unit comprises a fifth micro-mixer, a fourth micro-channel reactor, and a first back pressure valve; an outlet of the continuous concentrator is connected to a first inlet of the fifth micro-mixer to allow the concentrated liquid to enter the fifth micro-mixer; a solution of the sulfenylating reagent (10) is fed to the fifth micro-mixer through a second inlet of the fifth micro-mixer; an outlet of the fifth micro-mixer is connected to an inlet of the fourth micro-channel reactor; an outlet of the fourth micro-channel reactor is connected to an inlet of the first back pressure valve; the concentrated liquid and the solution of the sulfenylating reagent (10) are mixed in the fifth micro-mixer and then enter the fourth micro-channel reactor to undergo the sulfenylation to produce a fourth reaction mixture; and the fourth reaction mixture then flows into the first back pressure valve;

a solvent for preparing the solution of the sulfenylating reagent (10) is selected from the group consisting of N,N-dimethylformamide, N,N-dimethylacetamide, N,N-methylpyrrolidone, sulfolane, and thionyl chloride;

the fifth micro-mixer is a static mixer, a T-type micro-mixer, a Y-type micro-mixer, a coaxial-flow micro-mixer, or a flow-focusing micro-mixer;

a molar ratio of the sulfenylating reagent (10) to the (3aS, 6aR)-lactone (9) in the concentrated liquid is 0.8-5.0:1;

the fifth micro-mixer is controlled at 60-250° C.;

the fourth micro-channel reactor is controlled at 60-250° C.;

the fourth micro-channel reactor is a tubular micro-channel reactor or a plate-type micro-channel reactor; an inner diameter of the tubular micro-channel reactor is 100 μm-10 mm; the plate-type micro-channel reactor comprises a first heat exchange layer, a reaction layer, and a second heat exchange layer successively arranged from top to bottom; the reaction layer is provided with a reaction fluid channel having a hydraulic diameter of 100 μm-10 mm;

a residence time of a mixture of the concentrated liquid and the solution of the sulfenylating reagent (10) in the fourth micro-channel reactor is controlled to 1-30 min; and a back pressure of the first back pressure valve is set to 0.1-2 MPa.

6. The full continuous-flow preparation method of claim 5, wherein in step (S5), a structural formula of the zinc reagent (12) is:

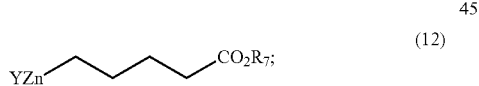

wherein Y is fluorine, chlorine, bromine, or iodine; $R_7$ is a $C_1$-$C_6$ alkyl, a $C_3$-$C_6$ cycloalkyl, a mono-substituted aryl, a poly-substituted aryl, a mono-substituted arylalkyl, or a poly-substituted arylalkyl;

a structural formula of the hydroxy valerate compound (13) is:

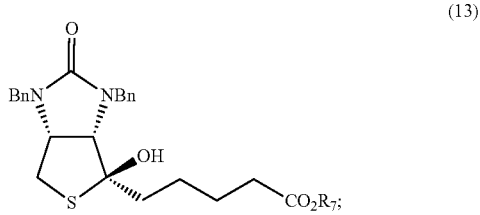

the fifth micro-reaction unit comprises a sixth micro-mixer, a fifth micro-channel reactor, and a second back pressure valve; an outlet of the first back pressure valve is connected to a first inlet of a sixth micro-mixer to allow the fourth reaction mixture to flow into the sixth micro-mixer; a solution of the zinc reagent (12) containing the palladium catalyst is fed to the sixth micro-mixer through a second inlet of the sixth micro-mixer; an outlet of the sixth micro-mixer is connected to an inlet of the fifth micro-channel reactor; an outlet of the fifth micro-channel reactor is connected to an inlet of a second back pressure valve; the fourth reaction mixture and the solution of the zinc reagent (12) are mixed in the sixth micro-mixer and then enter the fifth micro-channel reactor to undergo the Fukuyama coupling reaction to produce a fifth reaction mixture; and the fifth reaction mixture then flows from the fifth micro-channel reactor into the second back pressure valve;

the palladium catalyst is selected from the group consisting of palladium acetate, di(triphenylphosphine)palladium dichloride, a Pd/C catalyst, nano-palladium, and palladium hydroxide on carbon;

a solvent for preparing the solution of the zinc reagent (12) is selected from the group consisting of N,N-dimethylformamide, N,N-dimethylacetamide, N,N-methylpyrrolidone, sulfolane, and thionyl chloride;

a molar ratio of the (3aS, 6aR)-thiolactone (11) in the fourth reaction mixture to the palladium catalyst is controlled to 1:0.001-0.500;

the sixth micro-mixer is a static mixer, a T-type micro-mixer, a Y-type micro-mixer, a coaxial-flow micro-mixer, or a flow-focusing micro-mixer;

a molar ratio of the (3aS, 6aR)-thiolactone (11) to the zinc reagent (12) is controlled to 1:1.0-8.0;

the sixth micro-mixer is controlled at 5-160° C.;

the fifth micro-channel reactor is controlled at 5-160° C.;

the fifth micro-channel reactor is a tubular micro-channel reactor or a plate-type micro-channel reactor; an inner diameter of the tubular micro-channel reactor is 100 μm-10 mm; the plate-type micro-channel reactor comprises a first heat exchange layer, a reaction layer, and a second heat exchange layer successively arranged from top to bottom; and the reaction layer is provided with a reaction fluid channel having a hydraulic diameter of 100 μm-10 mm; and a residence time of a mixture of the fourth reaction mixture and the solution of the zinc reagent (12) in the fifth micro-channel reactor is controlled to 0.5-30 min.

7. The full continuous-flow preparation method of claim 6, wherein in step (S6), a structural formula of the alkenyl valerate compound (15) is:

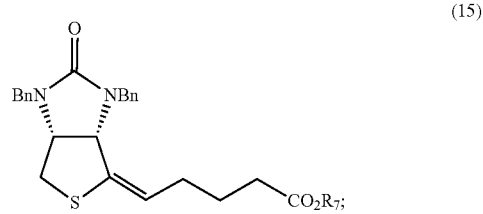

the inorganic mineral acid (14) is selected from the group consisting of sulfuric acid, hydrochloric acid, boric acid, phosphoric acid, carbonic acid, and nitric acid;

the sixth micro-reaction unit comprises a seventh micro-mixer, a sixth micro-channel reactor, and a first liquid-liquid separator; an outlet of the second back pressure valve is connected to a first inlet of the seventh micro-mixer to allow the fifth reaction mixture to enter the seventh micro-mixer; a solution of the inorganic mineral acid (14) is fed to the seventh micro-mixer through a second inlet of the seventh micro-mixer; an outlet of the seventh micro-mixer is connected to an inlet of the sixth micro-channel reactor; and the fifth reaction mixture and the solution of the inorganic mineral acid (14) are mixed in the seventh micro-mixer and then enter the sixth micro-channel reactor to undergo the elimination reaction to produce a sixth reaction mixture;

an outlet of the sixth micro-channel reactor is connected to an inlet of the first liquid-liquid separator to allow the sixth reaction mixture to enter the first liquid-liquid separator; and a third aqueous phase flows out of the first liquid-liquid separator through an aqueous phase outlet, and a third organic phase flows out of the first liquid-liquid separator through an organic phase outlet;

the solution of the inorganic mineral acid (14) is prepared by dissolving the inorganic mineral acid (14) in water;

the seventh micro-mixer is a static mixer, a T-type micro-mixer, a Y-type micro-mixer, a coaxial-flow micro-mixer, or a flow-focusing micro-mixer;

the seventh micro-mixer is controlled at 5-100° C.;

a molar ratio of the hydroxy valerate compound (13) in the fifth reaction mixture to the inorganic mineral acid (14) is 1:1-50;

the sixth micro-channel reactor is a tubular micro-channel reactor or a plate-type micro-channel reactor; an inner diameter of the tubular micro-channel reactor is 100 μm-10 mm; the plate-type micro-channel reactor comprises a first heat exchange layer, a reaction layer, and a second heat exchange layer successively arranged from top to bottom; and the reaction layer is provided with a reaction fluid channel having a hydraulic diameter of 100 μm-10 mm;

the sixth micro-channel reactor is controlled at 5-100° C.; and a residence time of a mixture of the fifth reaction mixture and the solution of the inorganic mineral acid (14) in the sixth micro-channel reactor is 0.5-30 min.

8. The full continuous-flow preparation method of claim 7, wherein in step (S7), a structural formula of the valerate ester (16) is:

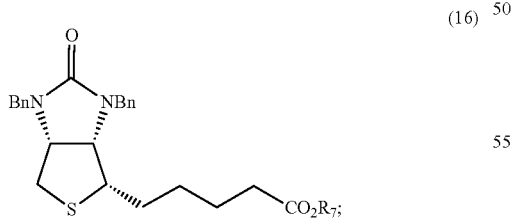

the seventh micro-reaction unit comprises an eighth micro-mixer, a seventh micro-channel reactor, a buffer tank and a third back pressure valve; the organic phase outlet of the first liquid-liquid separator is connected to a first inlet of the eighth micro-mixer to allow the third organic phase to enter the eighth micro-mixer; hydrogen gas is fed to the eighth micro-mixer through a second inlet of the eighth micro-mixer; an outlet of the eighth micro-mixer is connected to an inlet of the seventh micro-channel reactor; the third organic phase and the hydrogen gas are mixed in the eighth micro-mixer and then enter the seventh micro-channel reactor to undergo the selective reduction reaction to produce a seventh reaction mixture; an outlet of the seventh micro-channel reactor is connected to the buffer tank; a bottom of the buffer tank is provided with a liquid outlet equipped with a valve; a top of the buffer tank is provided with a first port, a second port, and a third port; the first port is connected to nitrogen gas to provide desired pressure for the buffer tank; a pressure of the nitrogen gas is 0.1-2.0 MPa; the third port is connected to the third back pressure valve; a back pressure of the third back pressure valve is set to 0.1-1.5 MPa, and the pressure of the nitrogen gas is 0.2-1.0 MPa larger than the back pressure of the third back pressure valve; and the second port is connected to the outlet of the seventh micro-channel reactor to allow the seventh reaction mixture to enter the buffer tank;

the Pd/C catalyst in step (S7) is a Pd/C catalyst with 0.5-30 wt. % Pd loading, a Pd(OH)$_2$/C catalyst with 0.5-30 wt. % Pd(OH)$_2$ loading, a mixture of the Pd/C catalyst with 0.5-30 wt. % Pd loading and an inert solid granular medium or a mixture of the Pd(OH)$_2$/C catalyst with 0.5-30 wt. % Pd(OH)$_2$ loading and an inert solid granular medium;

a molar ratio of the alkenyl valerate compound (15) in the third organic phase to the hydrogen gas is controlled to 1:0.8-50.0;

the eighth micro-mixer is controlled at 10-120° C.;

the seventh micro-channel reactor is controlled at 15-120° C.;

a residence time of a mixture of the third organic phase and the hydrogen gas in the seventh micro-channel reactor is 0.1-30 min;

the eighth micro-mixer is a static mixer, a T-type micro-mixer, a Y-type micro-mixer, a coaxial-flow micro-mixer, or a flow-focusing micro-mixer; and the seventh micro-channel reactor is a micro fixed-bed reactor filled with the Pd/C catalyst; and the micro fixed-bed reactor has an inner diameter of 1-100 mm.

9. The full continuous-flow preparation method of claim 8, wherein in step (S8), a structural formula of the valeric acid salt (18) is:

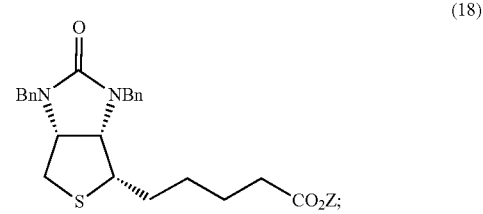

wherein Z is Na$^+$ or K$^+$;

the eighth micro-reaction unit comprises a ninth micro-mixer, an eighth micro-channel reactor, and a second liquid-liquid separator; the liquid outlet of the buffer tank is connected to a first inlet of the ninth micro-mixer to allow the seventh reaction mixture to enter the ninth micro-mixer; a solution of the inorganic base (17) is fed to the ninth micro-mixer through a second inlet of the ninth micro-mixer; an outlet of the ninth micro-mixer is connected to an inlet of the eighth micro-channel reactor; the seventh reaction mixture and the solution of the inorganic base (17) are mixed in the ninth micro-mixer and then enter the eighth micro-channel reactor to undergo the hydrolysis reaction to produce an eighth reaction mixture;

the inorganic base (17) is selected from the group consisting of sodium hydroxide, potassium hydroxide, lithium hydroxide, sodium carbonate, potassium carbonate, and lithium carbonate; and the solution of the inorganic base (17) is prepared by dissolving the inorganic base (17) in water;

an outlet of the eighth micro-channel reactor is connected to an inlet of the second liquid-liquid separator to allow the eighth reaction mixture to enter the second liquid-liquid separator for separation; a fourth aqueous phase flows out of the second liquid-liquid separator through an aqueous phase outlet, and a fourth organic phase flows out of the second liquid-liquid separator through an organic phase outlet;

the ninth micro-mixer is a static mixer, a T-type micro-mixer, a Y-type micro-mixer, a coaxial-flow micro-mixer, or a flow-focusing micro-mixer;

a molar ratio of the valerate ester (16) in the seventh reaction mixture to the inorganic base (17) is 1:0.75-30;

the ninth micro-mixer is controlled at 2-120° C.;

the eighth micro-channel reactor is controlled at 15-150° C.;

the eighth micro-channel reactor is a tubular micro-channel reactor or a plate-type micro-channel reactor; an inner diameter of the tubular micro-channel reactor is 100 μm-50 mm; and a hydraulic diameter of a reaction fluid channel of the plate-type micro-channel reactor is 100 μm-50 mm; and a residence time of a mixture of the seventh reaction mixture and the solution of the inorganic base (17) in the eighth micro-channel reactor is 0.1-30 min.

10. A full continuous-flow preparation method of claim 9, wherein the ninth micro-reaction unit comprises a tenth micro-mixer, a ninth micro-channel reactor, and a tenth micro-channel reactor; the aqueous phase outlet of the second liquid-liquid separator is connected to a first inlet of the tenth micro-mixer to allow the fourth aqueous phase to enter the tenth micro-mixer; a solution of the inorganic mineral acid (19) is fed to the tenth micro-mixer through a second inlet of the tenth micro-mixer; an outlet of the tenth micro-mixer is connected to an inlet of the ninth micro-channel reactor; and the fourth aqueous phase and the solution of the inorganic mineral acid (19) are mixed in the tenth micro-mixer and then enter the ninth micro-channel reactor to undergo the debenzylation reaction to produce a ninth reaction mixture;

the inorganic mineral acid (19) is hydrogen bromide or hydrogen chloride; and the solution of the inorganic mineral acid (19) is prepared by dissolving the inorganic mineral acid (19) in water;

a molar ratio of the valeric acid salt (18) in the fourth aqueous phase to the inorganic mineral acid (19) is 1:0.75-30;

the tenth micro-mixer is controlled at −10-25° C.;

the ninth micro-channel reactor is controlled at 25-200° C.;

a residence time of a mixture of the fourth aqueous phase and the solution of the inorganic mineral acid (19) in the ninth micro-channel reactor is 0.1-30 min;

the tenth micro-mixer is a static mixer, a T-type micro-mixer, a Y-type micro-mixer, a coaxial-flow micro-mixer, or a flow-focusing micro-mixer;

the ninth micro-channel reactor is a tubular micro-channel reactor, a microwave flow reactor or a plate-type micro-channel reactor; an inner diameter of the tubular micro-channel reactor is 100 μm-50 mm; a hydraulic diameter of a reaction fluid channel of the plate-type micro-channel reactor is 100 μm-50 mm; and a hydraulic diameter of a reaction fluid channel of the microwave flow reactor is 100 μm-50 mm;

an outlet of the ninth micro-channel reactor is connected to an inlet of the tenth micro-channel reactor to allow the ninth reaction mixture to enter the tenth micro-channel reactor;

the tenth micro-channel reactor is a tubular micro-channel reactor or a plate-type micro-channel reactor; an inner diameter of the tubular micro-channel reactor is 1-10 mm; and a hydraulic diameter of a reaction fluid channel of the plate-type micro-channel reactor is 1-10 mm; and the tenth micro-channel reactor is controlled at −35-15° C. to allow the target product (+)-biotin (1) to be crystallized and precipitated; and a reaction mixture flowing out of the tenth micro-channel reactor is collected and filtered to obtain the target product (+)-biotin (1).

* * * * *